Figure 1:
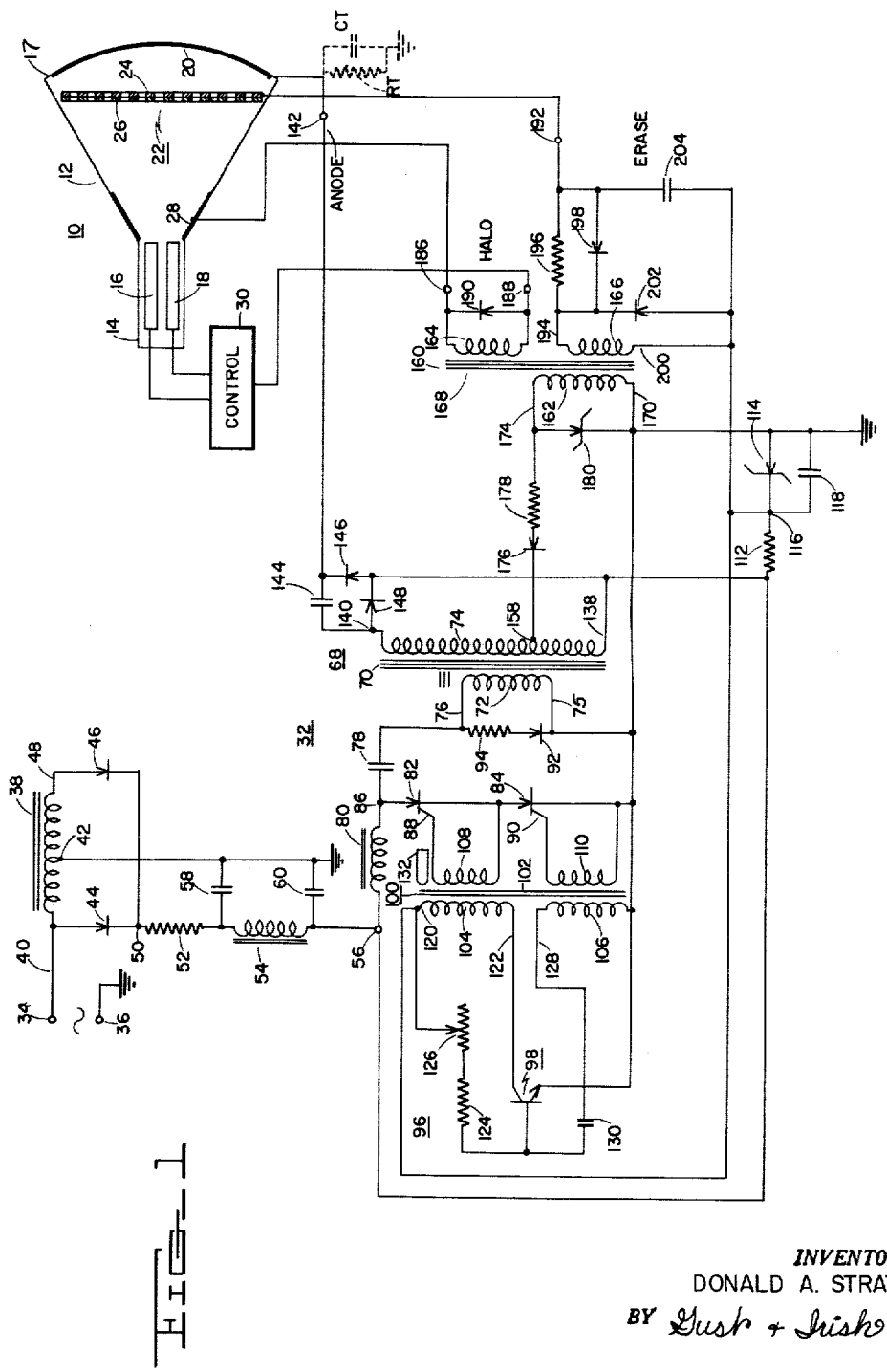

Nov. 5, 1963

D. A. STRATTON 3,109,956

POWER SUPPLY SYSTEM

Filed Oct. 7, 1960

2 Sheets-Sheet 1

INVENTOR.
DONALD A. STRATTON
BY Gust + Irish
ATTORNEYS

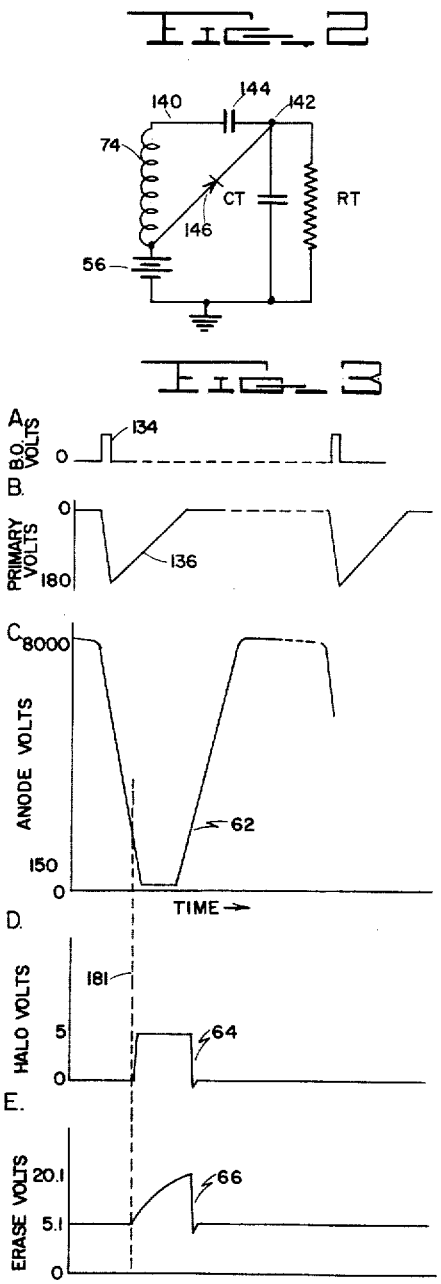

United States Patent Office 3,109,956
Patented Nov. 5, 1963

3,109,956
POWER SUPPLY SYSTEM
Donald A. Stratton, Fort Wayne, Ind., assignor to
Telex, Inc., St. Paul, Minn.
Filed Oct. 7, 1960, Ser. No. 61,217
19 Claims. (Cl. 315—14)

This invention relates generally to power supply systems, and more particularly to a power supply system for supplying a direct current voltage at an elevated potential to a capacitive load, such as the anode of a direct viewing storage tube, and adapted to have the output voltage rapidly pulsed to a lower potential at a predetermined repetition rate.

In certain systems employing direct viewing charge storage tubes, it is required that the stored information on the storage electrode be erased at a relatively high repetition rate, such as for example from 500 to 2,000 erasures per second. Charge storage tubes are commonly operated with the phosphor display screen or anode at an elevated potential with reference to ground, such as 8,000 volts positive, which during erasure, however, is required to be reduced rapidly to a potential approaching ground, such as +150 volts. Such rapid reduction or "dunking" of the anode potential for erasure is readily accomplished at more moderate erasure rates, however, since the anode represents a highly capacitive load with high shunt resistance, i.e., for example 100 micromicrofarads and 100 megohms respectively, to the best of the present applicant's knowledge, it has not been possible to provide such rapid dunking of the anode potential by virtue of the highly capacitive character of the load presented to the power supply and the requirement that this capacitance be discharged and recharged at such a relatively high rate.

In addition to the foregoing, during erasure of a charge storage tube, it is desirable to impress voltage pulses on other tube elements, e.g., a substantially square voltage pulse is required to be applied to an element of the flood electron gun or the wall coating immediately adjacent thereto for halo suppression purposes, and a voltage pulse having an exponential or generally saw-tooth waveform is required to be applied to the conductive screen portion of the charge storage electrode, it being required that these additional voltage pulses be accurately timed with reference to the anode voltage pulse.

It is accordingly an object of my invention to provide an improved power supply system adapted to have its output voltage rapidly pulsed from one predetermined level to another at a predetermined repetition rate.

Another object of my invention is to provide an improved power supply system for supplying a direct current output voltage to a highly capacitive load and adapted to have the output voltage rapidly pulsed from an elevated potential with reference to ground to a lower potential at a predetermined repetition rate.

A further object of my invention is to provide an improved power supply system for supplying to the anode of a direct viewing storage tube a direct current output voltage at an elevated potential with reference to ground and adapted to be rapidly pulsed or dunked to a lower potential at a predetermined repetition rate, and to supply to another electrode of the tube pulses accurately timed with reference to the output voltage dunking pulses.

Further objects and advantages of my invention will become apparent by reference to the accompanying drawings and the following description, and the features of novelty which characterize my invention will be pointed out with particularity in the claims annexed to and forming a part of this specification.

My invention, in its broader aspects, provides a power supply system adapted to have its output voltage pulsed with a predetermined polarity from one predetermined level to another predetermined level at a predetermined repetition rate, and comprises a transformer having primary and secondary winding means, a source of input pulses of given polarity and having said predetermined repetition rate coupled to said primary winding means for producing pulses of said predetermined polarity in said secondary winding means. An output terminal is provided serially connected to one point on the secondary winding means by a capacitor and another point on the secondary winding means is coupled to a source of reference potential. Rectifying means is provided coupled between the output terminal and a point on the secondary winding means, the last-named point being so located and the polarization of the rectifying means being such that the rectifying means is blocked when the output voltage is between the one level and the other level and the rectifying means conducts thereby passing charging current from said reference voltage source through said capacitor when the output voltage reaches the other predetermined level.

In the drawings:
FIG. 1 is a schematic illustration of the improved power supply system of my invention;
FIG. 2 is a fragmentary schematic illustration useful in explaining the mode of operation of the system of FIG. 1;
FIG. 3 shows waveforms found in the system of FIG. 1;
FIG. 4 shows waveforms also useful in explaining the mode of operation of my invention; and
FIG. 5 is another diagram showing further waveforms useful in explaining the operation of my invention.

Referring now to FIG. 1, there is schematically shown at 10 a conventional direct viewing charge storage tube having an enclosing envelope 12 with neck portion 14 at one end thereof and faceplate portion 17 at the other end. High velocity electron writing gun 16 and low velocity electron flood gun 18 are disposed in neck portion 14 of envelope 12 and a phosphor display screen 20 is formed on the inner surface of faceplate 17. A charge storage screen assembly 22 is provided within the envelope 12 adjacent the display screen 20 and conventionally comprises a metallic screen 24 having dielectric material 26 with secondary emissive properties coated on the surface of screen 24 facing the electron guns 16 and 18. It will be readily comprehended that the charge storage tube 10 will conventionally be provided with other elements including writing beam deflection and flood beam collimating elements, accelerating electrodes and wall coatings, etc., it being sufficient to state that the tube 10 is provided with a wall coating 28 adjacent electron guns 16 and 18. Storage tube 10 is provided with suitable write-read and erase control circuitry 30 which, along with storage tube 10 is well known to those skilled in the art and does not form a part of my invention.

The improved power supply system of my invention for storage tube 10 is shown at 32. A pair of input terminals 34 and 36 are provided for connection to a suitable source of alternating current such as 115 volts, 400 cycles, input terminal 36 being grounded as shown. An autotransformer 38 is provided having one end 40 connected to input terminal 34 and having a center tab 42 connected to ground. Oppositely polarized diodes 44 and 46 are respectively connected to ends 40 and 48 of auto-transformer 38 and are connected together at 50 to provide a conventional full-wave rectifier system. A suitable surge limiting resistor 52 and choke 54 are serially connected between point 50 and direct current terminal 56 with filter capacitors 58 and 60 respectively connecting the ends of choke 54 to ground, as shown, thus providing a filtered direct current voltage such as +150 volts at terminal 56.

Turning now briefly to FIGS. 3C, D and E, it is desired that a direct current voltage which may be approximately 8,000 volts positive be applied to the phosphor display screen or anode 20 of tube 10 during writing and reading, which voltage is pulsed or dunked negatively to a potential relatively close to ground, such as +150 volts, as at 62, at a selectively variable repetition rate, for example between 500 and 2,000 pulses per second. It is also required that positive-going pulses 64 having an amplitude which may be on the order of +15 volts be applied to wall coating 28 of tube 10 and that the pulses 64 be respectively initiated when the high voltage pulse 62 has been greatly reduced. It is further required that a relatively low positive potential, such as +5.1 volts be applied to the metal screen 24 of the charge storage screen 22 and that this voltage be pulsed positively with an exponential or sawtooth waveform by approximately 15 volts, to a total of +20.1 volts in synchronism with pulses 64.

In order to provide the requisite output voltages for anode 20 and metallic screen 24 of tube 10 and the pulses 62, 64 and 66, I provide a transformer 68, preferably of the high reactance variety, having a magnetic core 70 with a primary winding 72 and secondary winding 74 disposed thereon. Primary winding 72 has its end 75 directly connected to ground, as shown, and has its other end 76 connected to terminal 56 through a serially connected capacitor 78 and choke 80. A pair of silicon switches 82 and 84 are serially connected between the midpoint 86 between capacitor 78 and choke 80 and ground, the switches 82 and 84 respectively having gate terminals 88 and 90 and being of the type which are triggered closed or "on" responsive to application of a small positive-going trigger pulse on the gate terminals 88 and 90 respectively. A diode 92 and resistor 94 are serially connected across the primary winding 72, as shown.

The trigger pulses for the silicon switches 82 and 84 are provided by a blocking oscillator 96 comprising an NPN transistor 98 and a transformer 100 comprising a magnetic core 102 having a primary winding 104, a feedback winding 106, and trigger pulse output windings 108 and 110 disposed thereon. In order to provide the requisite +5.1 volts to be applied to metallic screen 24 of tube 10 and also for energizing blocking oscillator 96, a suitable resistor 112 and Zener diode 114 are serially connected between terminal 56 and ground, Zener diode 114 conducting when the voltage drop thereacross is 5.1 volts, thereby clamping point 116 to 5.1 volts. Bypass capacitor 118 is connected in parallel with Zener diode 114. End 120 of winding 104 of transformer 100 is connected to point 116 thus impressing +5.1 volts thereon and end 122 is connected to the collector of transistor 98. Base bias for transistor 98 is supplied by resistor 124 and variable resistor 126 serially connected between end 120 of winding 104 and the base of transistor 98, adjustment of variable resistor 126 providing selective adjustment of the frequency of the output of blocking oscillator 96. The emitter of transistor 98 is directly connected to ground and end 128 of winding 106 of transformer 100 is connected to the base of transistor 98 by capacitor 130, the other end of winding 106 being also connected to ground. Winding 108 of transformer 100 has its two ends respectively connected to gate terminal 88 and the anode of silicon switch 82 and likewise, the ends of winding 110 of transformer 100 are respectively connected to gate terminal 90 and the anode of silicon switch 84. A single relatively high resistance short circuited turn 132 is provided on magnetic core 102 of transformer 100 in order to provide heavy loading thereof and to prevent oscillation.

With the system as thus far described, as indicated, a potential on the order of +150 volts is provided at terminal 56 and with switches 82 and 84 open, capacitor 78 will have a charge on the order of +200 volts thereon with end 76 of primary winding 72 of transformer 68 being essentially at ground potential. It will be seen that when silicon switches 82 and 84 are closed, capacitor 78 is directly connected across primary winding 72 to in essence form a tank circuit, and that the choke 80 is directly connected between terminal 56 and ground. Blocking oscillator 96 provides pulses 134 having an amplitude on the order of +1 volt in windings 108 and 110 of transformer 100, pulses 134 having a very short duration with reference to their period, i.e., .5 microsecond, whereas the period of pulses 134 at 500 pulses per second is 2,000 microseconds. Thus, with capacitor 78 charged to +200 volts due to current flow from point 56 through choke 80 and primary winding 72, application of pulses 134 to the back-bias terminals 88 and 90 of silicon switches 82 and 84 close the switches, connecting capacitor 78 across primary winding 72 thus allowing capacitor 78 to discharge through the primary 72 to provide negative-going voltage pulses 136 on the primary winding 72, end 76 of primary winding 72 reaching a potential on the order of −180 volts, as seen in FIG. 3B. While the trigger pulses 134 applied to trigger silicon switches 82 and 84 "on" have a very short duration, as seen in FIG. 3A, switches 82 and 84 are of the type which remain closed or "on" once triggered, until the voltage thereacross drops to zero. Thus, when the voltage across switches 82 and 84 drops to zero as a result of discharge of capacitor 78, switches 82 and 84 are opened or turned "off," thus interrupting the flow of discharge current from capacitor 78 therethrough and also interrupting the flow of current from terminal 56 through choke 80 to ground. Interruption of the flow of current through choke 80 provides an inductive kick of voltage across capacitor 78 and winding 72 which rapidly restores the voltage in end 76 of primary winding 72 to its ground potential level and hastens recharging of capacitor 78. Pulses 136 are in fact sharply peaked with reference to their period, it having been found that from the initiation of the respective trigger pulse 134, pulse 136 reaches its negative peak in one microsecond and returns to ground potential in twelve microseconds, whereas discharge of capacitor 78 requires on the order of 3.5 microseconds and its recharging on the order of 1500 microseconds. Diode 92 and current limiting resistor 94 are provided in order to prevent oscillation of the circuit including capacitor 78 and primary winding 72 thus insuring that pulses 136 are unidirectional in character.

Secondary winding 74 of transformer 68 has one end 138 connected to terminal 56 and is thus at a potential of +150 volts, and its other end 140 connected to anode output terminal 142 by capacitor 144 which preferably has a capacitance substantially greater than the anode-to-ground capacitance of anode 20 of tube 10. A diode 146 is provided connected between anode output terminal 142 and end 138 of secondary winding 74 and another diode 148 is connected across secondary winding 74.

Referring additionally to FIGS. 2 and 4, the anode-to-ground capacitance of anode 20 of tube 10 is represented by capacitance CT and the shunt resistance of the anode 20 is indicated by resistance RT. Assuming first that the system is being initially energized and that any prior charge on the anode capacitance CT has leaked off to ground, inspection of FIG. 2 will clearly reveal that diode 146 and the shunt resistance RT are serially connected between +150 volts at point 56 and ground. Thus, current will flow from terminal 56 through diode 146 and shunt resistance RT thereby developing a voltage drop closely approaching 150 volts across shunt resistor RT and charging the anode capacitance CT to +150 volts. It will further be observed that prior to occurrence of an input pulse 136 in primary winding 72 of transformer 68, end 140 of secondary winding 74 will be essentially at +150 volts, and thus, under these conditions, anode terminal 142 and end 140 of secondary winding 74 will both be at essentially +150 volts, and therefore, there being no voltage drop across capacitor 144, capacitor 144 will be completely discharged. However, impression of an input pulse 136 on primary winding 72 of transformer 68 induces a negative-going pulse 150 in secondary winding 74 having an amplitude on the order of 8,000 volts; it will be observed that since end 138 of winding 74 is directly connected to terminal 56 and is thus at +150 volts, end 140 of winding 74 will also initially be at a potential of +150 volts, thus falling to −7850 volts at the peak of negative-going pulse 150. Inspection of FIG. 2 will now further reveal that charging current will flow from terminal 56 through diode 146, capacitor 144, and winding 74 whenever end 140 of winding 74 falls below +150 volts. Thus, again considering a condition when the system is initially energized, as soon as an input pulse 136 is impressed upon primary winding 72 thus inducing a negative-going pulse 150 in secondary winding 74, end 140 of secondary winding 74 will fall below +150 volts and thus charging current will flow through capacitor 144. Under open circuit conditions the potential of end 140 of winding 74 would reach a full −7850 volts, i.e., a pulse amplitude of 8,000 volts, however, by virtue of losses due to the charging current flowing through capacitor 144, the actual voltage of point 140 at the peak of pulse 150 will be on the order of −7800 volts. Thus, at the peak of the first secondary pulse 150 with anode terminal 142 clamped to +150 volts by virtue of current flow through diode 146 and shunt resistance RT and with end 140 of secondary winding 74 at a potential of −7800 volts, capacitor 144 will be charged to a potential of 7950 volts. As the potential of end 140 of secondary winding 74 returns from its negative 7800 volt peak to +150 volts, the potential of anode output terminal 142 correspondingly rises with the charging current flowing through the capacitor. Thus, the potential of anode output terminal 142 would be expected to rise to +8100 volts, i.e., 150 volts plus the 7950 volt charge on the capacitor 144, however, by virtue of losses due ot the flow of charging current in capacitor 144, the potential of anode output terminal 142 actually rises to +8000 volts. It will be readily understood that increase of the potential of the anode output terminal 142 from +150 volts to +8000 volts will actually occur over a period of three or four cycles rather than in a single cycle as described.

Assuming now that the anode output terminal 142 is at a potential of +8000 volts at the end of a secondary pulse 150, the charge on the anode capacitance CT will gradually leak off to a lower potential level dependent upon the period of the pulses. Thus, with a pulse repetition rate of 500 cycles per second over a period of 2,000 microseconds, the +8000 volt charge on the anode capacitance CT will leak off to a potential level on the order of +7800 volts at the occurrence of the next trigger pulse 134 and input pulse 136, as indicated by the dashed line 152 in FIG. 4. As previously indicated, impression of an input pulse 136 on primary winding 72 induces the negative-going pulse 150 in secondary winding 74 with the potential of end 140 of secondary winding 74 dropping from +150 volts to −7800 volts and with discharge current from the anode capacitance CT and capacitor 144 flowing through the relatively low direct current power supply impedance to ground. The potential of anode output terminal 142 thus follows the potential of end 140 of secondary winding 74 in a negative-going direction, being separated therefrom by the charge on capacitor 144, which will be seen to be 7650 volts with an anode output terminal potential of 7800 volts, until the potential of anode output terminal 142 reaches +150 volts; by referring briefly back to FIG. 2, it will be seen that so long as the potential of anode output terminal 142 is above +150 volts, diode 146 will be blocked since its anode is connected to terminal 56 which is at a potential of +150 volts. If diode 146 were not provided, the potential of anode output terminal 142 would follow negative-going secondary pulse 150, as shown by the dashed lines 154 to a potential on the order of −150 volts. Under these conditions, upon return of the potential of end 140 of secondary winding 74 to +150 volts at the end of a pulse 150, the potential of anode output terminal 142 would likewise increase, however, it will be seen that even under ideal conditions and ignoring losses, the potential of anode output terminal 142 could not exceed 7800 volts, i.e., 150 volts plus the charge on the capacitor of 7650 volts. However, due to losses in the circuit by virtue of the flow of charging current of capacitance 144 therein, the actual voltage of anode output terminal 142 at the end of a pulse 150 and in the absence of diode 146 would be something lower than 7800 volts, i.e., more likely in the neighborhood of 7000 volts, which then would be reduced still further due to leakage of the anode capacitance CT during the interval prior to the initiation of the next pulse. This situation is, however, prevented by provision of diode 146 which conducts when the anode output terminal 142 tends to fall below a potential of +150 volts. Conduction of diode 146 thus provides charging current through capacitor 144 and secondary winding 74 and importantly clamps the potential of anode output terminal to +150 volts, as at 156 in FIG. 4. Thus, when the pulse 150 reaches its negative-going peak of 7800 volts, it will be seen that the voltage developed across the capacitor 144 is 7950 volts, and therefore, the potential of anode output terminal 142 will again rise to +8000 volts upon termination of the secondary pulse 150 as previously explained.

Diode 148 is provided in order to prevent oscillation of the circuit including capacitor 144 and secondary winding 74 of transformer 68. It will be observed that diode 148 is polarized so as to conduct when end 140 of secondary winding 74 is at a potential higher than +150 volts, the cathode of diode 148 being connected to terminal 56 which is at a potential of +150 volts. Thus, when end 140 of secondary winding 74 returns to +150 volts at the end of a secondary pulse 150, in the absence of diode 148, end 140 would tend to swing even further positive to initiate a damped oscillatory cycle by virtue of the capacitor 144. However, with the provision of diode 148 polarized as shown, when end 140 of secondary winding 74 tends to swing more positive than +150 volts, diode 148 conducts, thereby clamping end 140 of secondary winding 74 to a potential of +150 volts. With the circuit constants to be hereinafter described, and with a pulse repetition rate of 500 cycles per second, output voltage pulse 62 reaches its lower level 156 in five microseconds following its initiation 152, the lower level 156 is maintained for approximately four microseconds, and the output voltage then returns to its +8000 volt level in approximately ten microseconds.

Referring now to the positive-going pulses 64 and 66, as indicated, it is desired that these pulses be initiated when the negative-going pulse 62 is well toward its lower level, i.e., +150 volts. To accomplish this, a tap 158 is provided on secondary winding 74 of transformer 70 at approximately 250 volts open circuit, and it will thus be seen that with end 138 of secondary winding 74 clamped to +150 volts, tap 158 will swing to approximately −100 volts when the 8,000 volt negative-going pulse 150 is induced in secondary winding 74. Another transformer 160 is provided having a primary winding 162 and two secondary windings 164 and 166 on magnetic core 168. End 170 of primary winding 162 is connected to ground, as shown, and end 174 is connected to tap 158 by a diode 176 and current limiting resistor 178. A Zener diode 180 is connected across primary winding 162 of transformer 160. It will now be seen that when the negative-going pulse 150 is induced in second winding 74 of transformer 68 and when tap 158 reaches ground potential and goes negative, diode 176 will conduct thereby passing current through primary winding 162 of transformer 160 to provide an input pulse therein, the point at which diode 176 begins to conduct and at which the input pulse in primary 162 is initiated, being shown by dashed line 181 in FIG. 3. Zener diode 180 is arranged to conduct at a voltage of 34 volts, thus clamping the input pulse 182 in the primary 162 to that level. Referring briefly to FIG. 5, it will be seen that tap 158 is at a potential of 150 volts prior to occurrence of a trigger pulse 134 and pulse 136 in primary winding 72 of transformer 68. Upon the occurrence of a trigger pulse 134 and an input pulse 136 in primary winding 72 and the resultant induction of negative-going pulse 150 in secondary winding 74, the potential of tap 158 drops from +150 volts to −100 volts, as shown by the dashed line 184. As indicated, when point 158 reaches ground potential, diode 176 begins to conduct, passing current through primary winding 162 of transformer 160 to form input pulse 182 which is clamped at −34 volts by Zener diode 180.

The positive-going halo-suppression pulses 64 are provided by secondary winding 164 of transformer 160 with one output terminal 186 being connected to wall coating 28 and the other output terminal 188 being connected to the storage tube control circuitry 30, as shown. Diode 190 is provided in order to prevent overswing of pulses 64 following termination of the input pulses 182.

The positive-going exponential or saw-tooth pulses 66 are provided by secondary winding 166 of transformer 160. Here, the conductive screen 24 of charge storage screen 22 is connected to output terminal 192 which in turn is connected to end 194 of secondary winding 166 by resistor 196 having diode 198 in parallel therewith. End 200 of secondary winding 166 is connected to point 116 and thus is clamped to a potential of 5.1 volts. Diode 202 is connected across secondary winding 166 and capacitor 204 is connected between output terminal 192 and end 200 of winding 166; it will be readily understood that resistor 196 and capacitor 204 cooperate to provide the exponential or saw-tooth characteristic of pulses 66 with diode 198 being polarized to provide fast recovery of the pulses, i.e., capacitor 204 charges through resistor 196 and discharges through diode 198. Diode 202 is provided in order to prevent overswing of pulses 66 following termination of input pulses 182. It will be seen that the point at which the positive-going pulses 64 and 66 are initiated with reference to the negative-going pulse 62 may be determined by proper selection of the reference potential to which end 170 of primary winding 162 of transformer 160 is connected; with end 170 of winding 162 connected to a source of negative reference potential, diode 176 would conduct at a point later during pulse 62.

In an actual circuit in accordance with my invention for providing the pulses 62, 64 and 66 as shown in FIG. 3 at a rate selectively variable between 500 and 2000 cycles per second the following components were employed:

Blocking oscillator transformer 100:

Core—A manganese zinc ferrite torroid having an outside diameter of .375 inch, an inside diameter of .120 inch and a height of .125 inch, the core material being referred to by the tradename Ferroxcube 204-F-1253C;
Windings 104, 106—fifteen turns #25 enamelled wire;
Windings 108, 110—five turns #25 enamelled wire;
Shorted turn 132—one turn of wire having a direct current resistance of 2 ohms;

High voltage transformer 68:

Core—A two part wound "C" core of two mil magnetic steel referred to by the tradename Silectron, the core cross-section being ¾ inch by ⅝ inch, the window being ⅝ inch by 1¹⁵⁄₁₆ inches, and with a .045 inch air gap in both legs, the core being of the type sold by the Arnold Engineering Company under the designation AL–21;
Primary winding 72—two coils in parallel, each having thirty-five turns of #25 enamelled wire, one coil on each leg of the core;
Secondary winding 74—three coils, one having 880 turns of #39 enamelled wire wound over one primary coil, one having 40 turns of #25 enamelled wire in the same layer as the other primary coil, and one having 720 turns of #39 enamelled wire, the latter coil also being wound over the other primary coil and the 40-turn coil;

Halo and erase pulse transformer 160:

Core—A two part wound C core of two mil steel referred to by the trade name Silectron, having a core cross-section of ¼ inch by ⅛ inch, and a window ¼ inch by ½ inch, the two cores being tightly butted with no air gap, being of the type sold by the Arnold Engineering Company; under the designation AL–1;
Primary winding 162—108 turns of #35 enamelled wire respectively forming the first and fourth layers on one leg of the core;
Secondary windings 164 and 166—each formed of 53 turns of #35 enamelled wire respectively forming the second and third layers on the core leg of the primary winding;

| | |
|---|---|
| Diodes 44, 46, 92 and 176 | 1N649. |
| Resistor 52 | 10 ohms. |
| Chokes 54 and 80 | .4 henry, 20 ohms. |
| Capacitors 58 and 60 | 4 microfarads. |
| Capacitor 78 | 1 microfarad. |
| Silicon switches 82 and 84 | 3A200A. |
| Transistor 98 | 2N333. |
| Resistor 124 | 30,000 ohms. |
| Variable resistor 126 | 100,000 ohms. |
| Capacitor 130 | .27 microfarad. |
| Resistor 94 | 18 ohms. |
| Capacitor 144 | 500 micromicrofarads. |
| Diodes 146, 148 | 1N2381. |
| Resistor 112 | 50,000 ohms. |
| Zener diode 114 | 1N751. |
| Capacitor 118 | 6.8 microfarads. |
| Resistor 178 | 330 ohms. |
| Zener diode 180 | 1N1784. |
| Diodes 190, 198 and 202 | 1N645. |
| Resistor 196 | 100 ohms. |
| Capacitor 204 | .027 microfarad. |

While the arrangement shown and described provides a direct current voltage at an elevated positive potential with reference to ground to the anode or display screen of a direct viewing storage tube, it will be readily comprehended that my invention is equally applicable to a system in which an elevated negative potential is applied to the cathode of an electron gun with the voltage then being pulsed positively for erasure, such a modification merely requiring reversal of the polarities of diodes 146 and 148. Further, while transistor 98 is shown as being of the NPN type, it will be readily comprehended that a PNP transistor or vacuum tube may be employed with suitable selection of voltages.

While I have illustrated and described a specific embodiment of my invention, further modification and improvements will occur to those skilled in the art and I desire therefore in the appended claims to cover all modifications which do not depart from the spirit and scope of my invention.

What is claimed is:

1. A power supply system adapted to have its output voltage pulsed with a predetermined polarity from one predetermined upper level to another predetermined lower level with reference to ground potential at a predetermined repetition rate comprising: a transformer having primary and secondary winding means; a source of input pulses having said predetermined repetition rate coupled to said primary winding means for inducing pulses of said predetermined polarity in said secondary winding means; an output terminal serially coupled to one point on said secondary winding means by a capacitor, another point on said secondary winding means being coupled to a source of reference potential; and rectifying means coupled between said output terminal and a point on said secondary winding means and forming a closed loop circuit with at least a part of said secondary winding means and said capacitor for passing capacitor charging current through said loop circuit when the voltage at said output terminal tends to become lower than said lower voltage level thereby clamping said output terminal to said lower voltage level during the peak of an induced pulse.

2. The combination of claim 1 wherein said input pulses source comprises: a source of direct current serially coupled with another capacitor across said primary winding means; and switching means for connecting said other capacitor directly across said primary winding means at said predetermined rate.

3. The combination of claim 1 wherein said input pulses source comprises: a second capacitor connected to one end of said primary winding means; a choke serially connected with said second capacitor; a source of direct current voltage coupled across said choke and the other end of said primary winding means; switching means interconnecting the point between said choke and second capacitor and the other end of said primary winding means for connecting said second capacitor directly across said primary winding means and said choke directly across said last-named source; and means for actuating said switching means at said predetermined rate.

4. The combination of claim 1 wherein said input pulses source comprises: a second capacitor connected to one end of said primary winding means; a source of direct current voltage coupled across said other capacitor and the other end of said primary winding means; switching means coupled across said second capacitor and said other end of said primary winding means and adapted when closed to connect said second capacitor directly across said primary winding means; and oscillator means coupled to said switching means for actuating the same at said predetermined rate.

5. The combination of claim 4 wherein said oscillator means closes said switching means for a time substantially shorter than its period.

6. The combination of claim 4 wherein said switching means comprises at least one silicon switch of the type which is triggered closed by a back-bias trigger pulse and remains closed until the voltage thereacross is reduced substantially to zero, said oscillator means being coupled to said silicon switch and supplying said trigger pulses thereto.

7. A power supply system adapted to have its output voltage pulsed with a predetermined polarity from one predetermined upper level to another predetermined lower level at a predetermined repetition rate comprising: a transformer having primary and secondary winding means; a source of input pulses of given polarity and having said predetermined repetition rate coupled to said primary winding means for inducing pulses of said predetermined polarity in said secondary winding means; an output terminal serially coupled to one end of said secondary winding means by a capacitor, the other end of said secondary winding means being coupled to a source of reference potential; and rectifying means coupled between said output terminal and said other end of said secondary winding and forming a closed loop circuit with said secondary winding means and said capacitor for passing capacitor charging current through said loop circuit when the voltage at said output terminal tends to become lower than the level of said reference potential thereby clamping said output terminal to said reference potential during the peak of an induced pulse.

8. A power supply system adapted to have its output voltage unidirectionally pulsed with a predetermined polarity and amplitude from a predetermined upper level to a predetermined lower level at a predetermined repetition rate comprising: a transformer having primary and secondary windings; a source of unidirectional input pulses of given polarity and having said predetermined repetition rate coupled to said primary winding for inducing pulses of said predetermined polarity and of an amplitude substantially equal to said predetermined amplitude in said secondary winding; an output terminal serially connected to one end of said secondary winding by a capacitor, the other end of said secondary winding being connected to a source of reference voltage having the same polarity and voltage level as said predetermined lower level; and a diode connected between said output terminal and said reference voltage source and forming a closed loop circuit with said secondary winding and capacitor, said diode being polarized to pass capacitor charging current through said loop circuit when the voltage at said output terminal tends to become lower than the level of said reference voltage thereby clamping said output terminal to said reference voltage during the peak of an induced pulse.

9. The combination of claim 8 wherein said input pulses are sharply peaked with a duration substantially shorter than the period thereof, and wherein said transformer is of the high reactance type.

10. The combination of claim 8 further comprising another diode connected across said secondary winding and polarized to conduct when the potential of said one end of said secondary winding is higher than the level of said reference voltage source and of the same polarity thereby preventing oscillation of the circuit including said secondary winding and capacitor.

11. A power supply system for supplying a direct current output voltage at a potential elevated with reference to ground by a predetermined amount to a highly capacitive load and adapted to be rapidly pulsed to a lower potential relatively near ground and of the same polarity as said elevated potential at a predetermined repetition rate, said system comprising: a high reactance transformer having primary and secondary windings; a source of sharply peaked unidirectional input pulses of given polarity and having said predetermined repetition rate with the duration thereof being substantially shorter than the period, said source being coupled to said primary winding for inducing pulses in said secondary winding having substantially the same amplitude as said elevated potential and the same polarity as the output voltage pulses; an output terminal serially connected to one end of said secondary winding by a capacitor having a capacitance which is substantially greater than the load capacitance, the other end of said secondary winding being connected to a source of direct current reference voltage having the same potential level and polarity as said output voltage lower potential whereby said one end of said secondary winding at the peak of an induced pulse is at a potential elevated with respect to ground but of the opposite polarity from that of said output voltage; a first diode connected between said output terminal and said reference voltage source and forming a closed loop circuit with said secondary winding and capacitor, said diode being polarized to pass capacitor charging current through said loop circuit when the voltage at said output terminal tends to become lower than the level of said reference voltage thereby clamping said output terminal to said reference voltage during the peak of an induced pulse; and a second diode connected across said secondary winding and polarized to conduct when the potential of said one end of said secondary winding is above the potential level of said reference voltage source and of the same polarity thereby preventing oscillation of the circuit including said secondary winding and capacitor.

12. The combination of claim 11 wherein said input pulses source comprises: another capacitor connected to one end of said primary winding; a choke serially connected with said other capacitor; a source of direct current voltage connected across said choke and the other end of said primary winding; a pair of silicon switches serially connected between the midpoint between said choke and capacitor and the other end of said primary winding, said switches when closed connecting said other capacitor in a shunt circuit directly across said primary winding and said choke directly across said last-named source whereby said other capacitor discharges through said primary winding to provide said input pulses, said switches respectively having gate terminals and including means for triggering the same closed by a back bias trigger pulse and for maintaining the same closed until the voltage thereacross is reduced substantially to zero; a blocking oscillator having two output circuits respectively coupled to said trigger terminals of said switches and supplying said trigger pulses thereto at said predetermined rate, said blocking oscillator including means for providing said trigger pulses with a duration which is substantially shorter than the period therebetween; and a third diode serially connected with a current limiting resistor across said primary winding, said third diode being polarized to prevent oscillation of said shunt circuit.

13. A power supply system for supplying a direct current output voltage at a first predetermined upper potential and adapted to be pulsed with a predetermined polarity to a second predetermined lower potential with reference to ground potential at a predetermined repetition frequency, and for supplying other output voltage pulses which are initiated when said output voltage has reached a predetermined intermediate level during pulsing from said first to second potentials, said system comprising: a first transformer having primary and secondary winding means; a source of pulses of given polarity and having said predetermined repetition rate coupled to said primary winding means for inducing pulses of said predetermined polarity in said secondary winding means; an output terminal serially coupled to one point on said secondary winding means by a capacitor, another point on said secondary winding means being coupled to a source of reference potential; rectifying means coupled between said output terminal and a point on said secondary winding means and forming a closed loop circuit with at least a part of said secondary winding means and said capacitor for passing capacitor charging current through said loop circuit when the voltage at said output terminal tends to become lower than said lower potential level thereby clamping said output terminal to said lower potential level during the peak of an induced pulse; a second transformer having primary and secondary winding means; said first transformer secondary winding means having a point thereon having a predetermined voltage level when said output voltage reaches said intermediate level during an induced pulse; second rectifying means coupling said second transformer primary winding means in a series circuit between said last-named point and a source of reference voltage for passing current from said last-named reference voltage source through said second transformer primary winding means when the voltage at said last-named point reaches said predetermined level thereby to provide input pulses which induce said other output voltage pulses in said second transformer secondary winding means; and an output circuit coupled to said second transformer secondary winding means.

14. The combination of claim 13 further comprising means coupled to one of said second transformer winding means for clipping said other output voltage pulses to a predetermined level.

15. The combination of claim 13 further comprising another output circuit coupled to said second transformer secondary winding means and including exponential waveform generating means for providing a second output voltage pulse in synchronism with said first named other output voltage pulse but having an exponential waveform.

16. A power supply system for supplying a direct current output voltage at a first predetermined upper potential and adapted to be pulsed with a predetermined polarity to a second predetermined lower potential at a predetermined repetition frequency, and for supplying other output voltage pulses which are initiated when said output voltage has reached a predetermined intermediate level during pulsing from said first to second potentials, said system comprising: a first transformer having primary and secondary winding means; a source of pulses of given polarity and having said predetermined repetition rate coupled to said primary winding means for inducing pulses of said predetermined polarity in said secondary winding means; an output terminal serially coupled to one end of said secondary winding means by a capacitor, the other end of said secondary winding means being coupled to a source of reference potential; first rectifying means coupled between said output terminal and said other end of said secondary winding means; and forming a closed loop circuit with said secondary winding and capacitor, said first rectifying means being polarized to pass capacitor charging current through said loop circuit when the voltage at said output terminal tends to be lower than the level of said reference potential thereby clamping said output terminal to said reference potential during the peak of an induced pulse; a second transformer having primary and secondary winding means; said first transformer secondary winding means having a point thereon intermediate the ends thereof providing a predetermined voltage level when said output voltage reaches said intermediate level during an induced pulse; second rectifying means coupling said second transformer primary winding means in a series circuit between said last-named point and a source of reference voltage for passing current from said last-named reference voltage source through said second transformer primary winding means when the voltage at said last-named point reaches said predetermined level thereby to provide an input pulse which induces said other output voltage pulse in said second transformer secondary winding means; and an output circuit coupled to said second transformer secondary winding means.

17. A power supply system for supplying to the anode of a direct viewing storage tube a first output voltage at a potential elevated with reference to ground by a predetermined amount and adapted to be rapidly pulsed to a lower potential near ground and of the same polarity as said elevated potential at a predetermined repetition rate, for supplying to a second electrode of said tube substantially square output voltage pulses of predetermined amplitude and the same polarity as said first output voltage which are respectively initiated when said first output voltage has reached a predetermined intermediate level during pulsing from said elevated potential to said lower potential, and for supplying to a third electrode of said tube a second direct current output voltage having the same polarity as said first output voltage and which is pulsed in exponential fashion with the same polarity as said square pulses to a potential higher with respect to ground in synchronism with said square pulses, said system comprising: a first high reactance transformer having primary and secondary windings; a source of sharply peaked unidirectional input pulses of given polarity and having said predetermined repetition rate with the duration thereof being substantially shorter than the period, said source being coupled to said primary winding for inducing pulses in said secondary winding having substantially the same amplitude as said elevated potential and the same polarity as the pulses of said first output voltage; an output terminal for connection to said anode serially connected to one end of said secondary winding by a capacitor having a capacitance which is substantially greater than the anode-to-ground capacitance of said tube, the other end of said secondary winding being connected to a source of direct current reference voltage having the same potential level and polarity as said first output voltage lower potential whereby said one end of said secondary winding at the peak of an induced pulse is at a potential elevated with respect to ground but of the opposite polarity from that of said first output voltage; a first diode connected between said output terminal and said reference voltage source and forming a closed loop circuit with said secondary winding and capacitor, said diode being polarized to pass capacitor charging current through said loop circuit when the voltage at said output terminal tends to become lower than the level of said reference voltage, thereby clamping said output terminal to said lower potential during the peak of an induced pulse; a second diode connected across said secondary winding and polarized to conduct when the potential of said one end of said secondary winding is above the potential of said reference voltage source and of the same polarity thereby preventing oscillation of the circuit including said secondary winding and capacitor; a pulse transformer having a primary winding and two secondary windings, said first transformer secondary winding having a tap thereon providing a predetermined voltage level when said output voltage reaches said intermediate level during an induced pulse; another source of reference potential; a third diode and a current limiting resistor serially connecting said pulse transformer primary winding between said tap and said other source of reference potential for passing current from said other reference potential source through said pulse transformer primary winding means when the voltage at said tap reaches said predetermined level thereby to provide input pulses which induce pulses in said pulse transformer secondary windings; a Zener diode connected across said pulse transformer primary winding and polarized to limit said last-named input pulses to a predetermined level; a first output circuit coupled to one of said second transformer secondary windings for connection to said second electrode; a fourth diode connected across said first output circuit for preventing overshooting of said square pulses; a second output circuit connected to the other of said second transformer secondary windings for connection to said third tube electrode, one end of said other secondary winding being coupled to a source of direct current reference voltage equal to said second output voltage and of the same polarity; a resistor serially connected in said second output circuit and a capacitor connected across said second output circuit for providing said exponential pulse; a fifth diode connected across said other secondary winding and polarized to prevent overshooting of the pulses induced therein, and a sixth diode connected across said last-named resistor and polarized to provide fast recovery of said exponential pulses.

18. A circuit for providing sharply peaked unidirectional pulses in an inductive winding at a predetermined repetition rate, said pulses having a duration substantially shorter than their period, said circuit comprising: a series circuit including an inductive device having a winding, a capacitor connected to one end of said winding and a choke serially connected to said capacitor; a source of direct current voltage connected across said series circuit; a static switching device connected across the point between said capacitor and choke and the other end of said winding, said switching device including means for closing the same responsive to the application of a trigger pulse thereby connecting said capacitor directly across said winding and said choke across said source whereby capacitor discharge current flows in said winding to provide said peaked pulses, said switching device including means for maintaining the same closed until the voltage thereacross is reduced substantially to zero; and an oscillator having an output circuit coupled to said switching device for supplying said trigger pulses thereto at said predetermined rate, said oscillator including means for providing said trigger pulses with a duration which is substantially shorter than the period thereof.

19. A circuit for providing sharply peaked unidirectional pulses in an inductive winding at a predetermined repetition rate, said pulses having a duration substantially shorter than their period, said circuit comprising: a series circuit including an inductive device having a winding on a magnetic core having substantial reactance, a capacitor connected to one end of said winding and a choke serially connected to said capacitor; a source of direct current voltage connected across said series circuit; a pair of silicon switches serially connected across the point between said choke and capacitor and the other end of said winding, said switches when closed connecting said capacitor directly across said winding and said choke directly across said source whereby said capacitor discharges through said winding to provide said pulses, opening of said switches causing said choke to provide an inductive kick thereby rapidly recharging said capacitor to terminate said pulses, said switches respectively having gate terminals and including means for triggering said switches closed by a back-bias trigger pulse and for maintaining the same closed until the voltage thereacross is reduced substantially to zero; a blocking oscillator having two output circuits respectively coupled to said gate terminals of said switches and supplying said trigger pulses thereto at said predetermined rate, said blocking oscillator including means for providing said trigger pulses with a duration which is substantially shorter than the period thereof and further including means for selectively determining said repetition rate; and a diode serially connected with a current limiting resistor across said winding, said diode being polarized to prevent oscillation of the circuit including said capacitor and said winding.

References Cited in the file of this patent
UNITED STATES PATENTS

| 2,415,302 | Maxwell | Feb. 4, 1947 |
| 2,548,789 | Hergenrother | Apr. 10, 1951 |
| 2,846,615 | De Lano et al. | Aug. 5, 1958 |

UNITED STATES PATENT OFFICE

CERTIFICATE OF CORRECTION

Patent No. 3,109,956                       November 5, 1963

Donald A. Stratton

It is hereby certified that error appears in the above numbered patent requiring correction and that the said Letters Patent should read as corrected below.

Column 9, line 33, for "other" read -- second --.

Signed and sealed this 28th day of April 1964.

(SEAL)
Attest:
ERNEST W. SWIDER

Attesting Officer

EDWARD J. BRENNER
Commissioner of Patents